US006747280B1

(12) United States Patent
Weiss

(10) Patent No.: US 6,747,280 B1
(45) Date of Patent: Jun. 8, 2004

(54) METHOD FOR THE INDIVIDUAL ADAPTATION OF EXCITATION INTENSITIES IN A MULTIBAND FLUORESCENCE MICROSCOPE AND MULTIBAND FLUORESCENCE MICROSCOPE FOR CARRYING OUT SAID METHOD

(75) Inventor: Albrecht Weiss, Linden (DE)

(73) Assignee: Leica Microsystems Wetzlar GmbH, Wetzlar (DE)

( * ) Notice: Subject to any disclaimer, the term of this patent is extended or adjusted under 35 U.S.C. 154(b) by 0 days.

(21) Appl. No.: 09/868,129

(22) PCT Filed: Nov. 27, 1999

(86) PCT No.: PCT/DE99/03768

§ 371 (c)(1),
(2), (4) Date: Jun. 14, 2001

(87) PCT Pub. No.: WO00/36451

PCT Pub. Date: Jun. 22, 2000

(30) Foreign Application Priority Data

Dec. 17, 1998 (DE) .......................... 198 58 206

(51) Int. Cl.[7] ................................................ F21V 9/16
(52) U.S. Cl. ................................ 250/458.1; 250/459.1
(58) Field of Search .......................... 250/458.1, 459.1, 250/461.1, 461.2; 356/124, 239.2

(56) References Cited

U.S. PATENT DOCUMENTS

| 5,371,624 | A | | 12/1994 | Nagano et al. ............. 359/389 |
| 5,710,663 | A | | 1/1998 | Kawasaki ................... 359/389 |
| 6,225,636 | B1 | * | 5/2001 | Ginestet .................. 250/458.1 |
| 6,510,001 | B1 | * | 1/2003 | Engelhardt et al. ......... 359/385 |
| 2003/0107732 | A1 | * | 6/2003 | Sasaki et al. ............... 356/318 |

FOREIGN PATENT DOCUMENTS

| JP | 06331894 | 12/1994 |
| WO | WO 98/45744 | 10/1998 |

* cited by examiner

Primary Examiner—David Porta
Assistant Examiner—Christine Sung
(74) Attorney, Agent, or Firm—Simpson & Simpson PLLC

(57) ABSTRACT

The invention relates to a method for the individual adaptation of excitation intensities in a multiband fluorescence microscope with several excitation bands that are different in their spectrums and with associated fluorescence bands. The intensities of the individual fluorescence bands in the microscope image are determined and compared with standard intensity values greater than or equal to zero. For every excitation band that is assigned to a fluorescence intensity deviating from the standard intensity values a selective filter (23; 28, 29, 31, 32) is introduced into the illumination optical path. The transmission degree of the illumination optical path is variably adjusted in such a manner that by attenuating the excitation band the associated fluorescence intensity is adjusted to its standard intensity value. A multiband fluorescence microscope for carrying out the method has a set of filter slides (20) close to the aperture diaphragm (5) which set consists of individually displaceable, closely spaced apart filter slides (21; 21a, 21b) with selective filters (23; 28, 29, 31, 32) with a continuously adjustable transmission degree for every excitation band and with at least one free opening (22). The invention also relates to various advantageous embodiments of the set of filter slides (20).

21 Claims, 4 Drawing Sheets

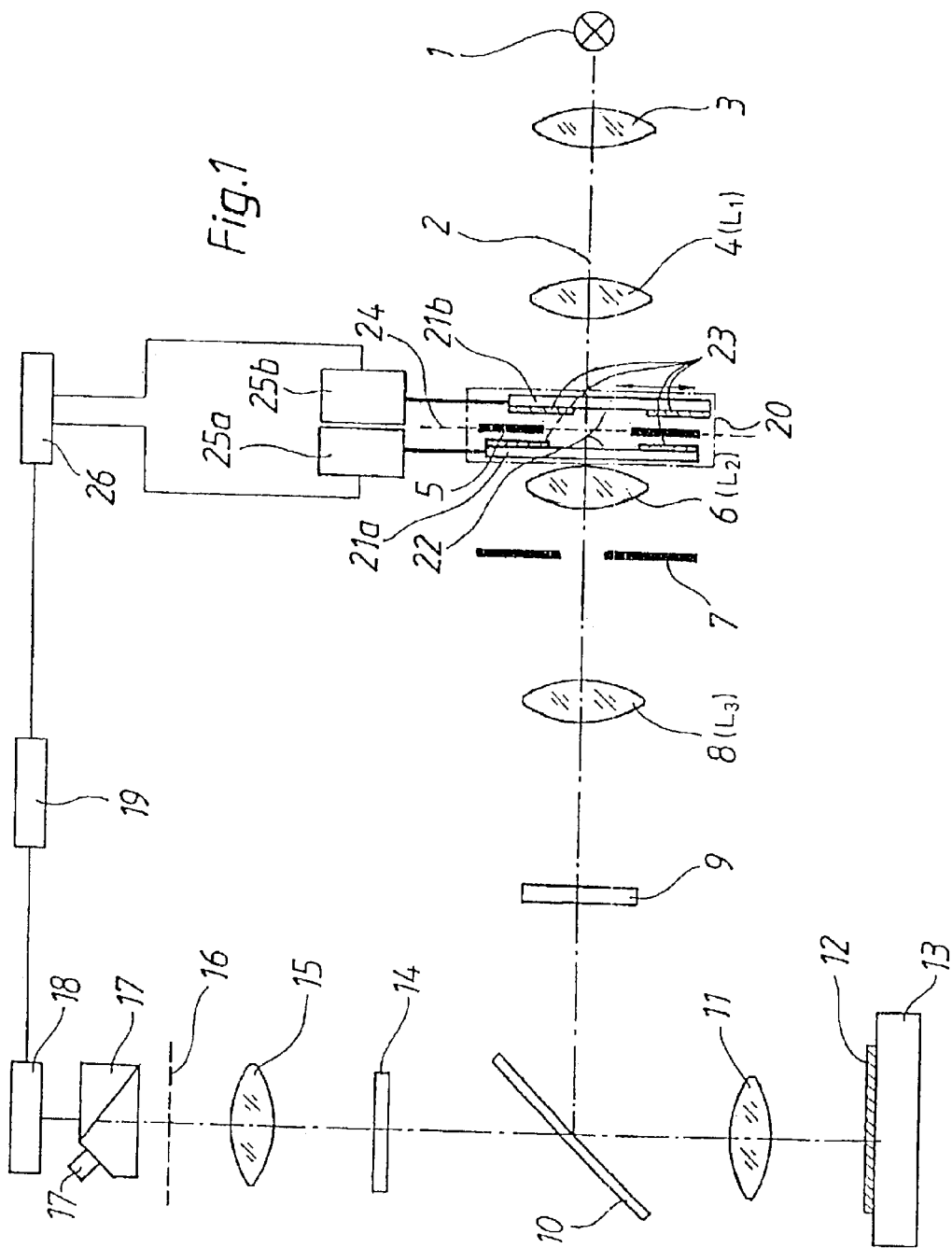

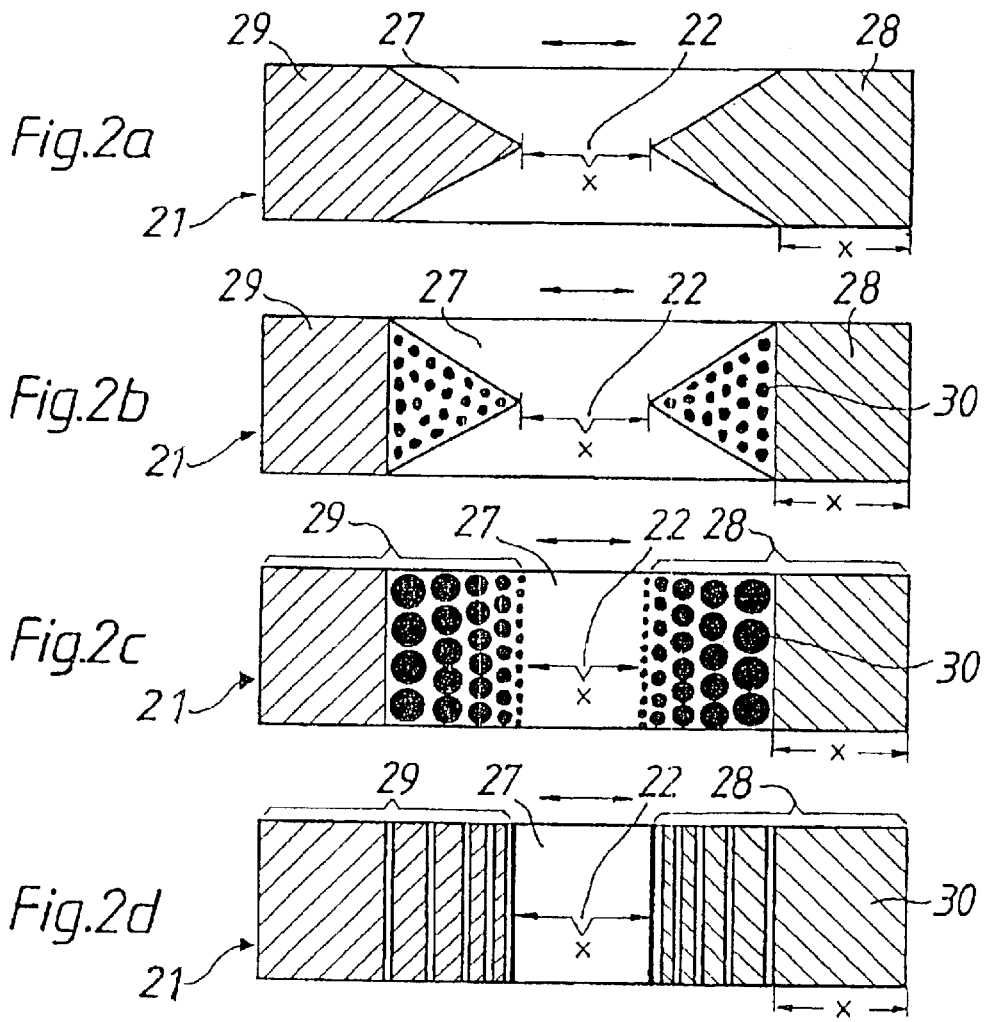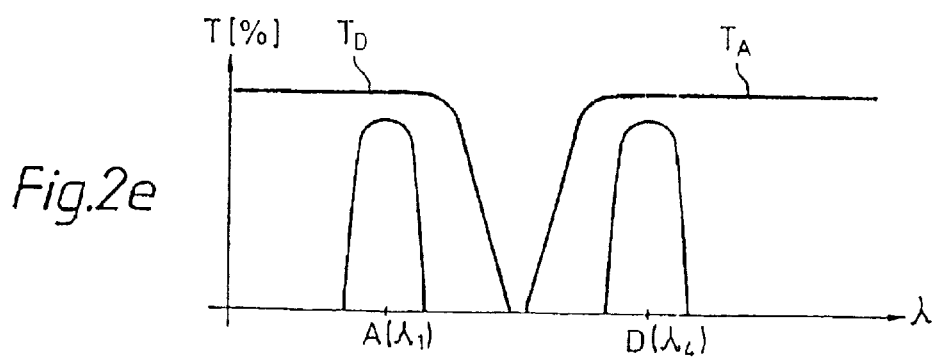

Figure 3A:
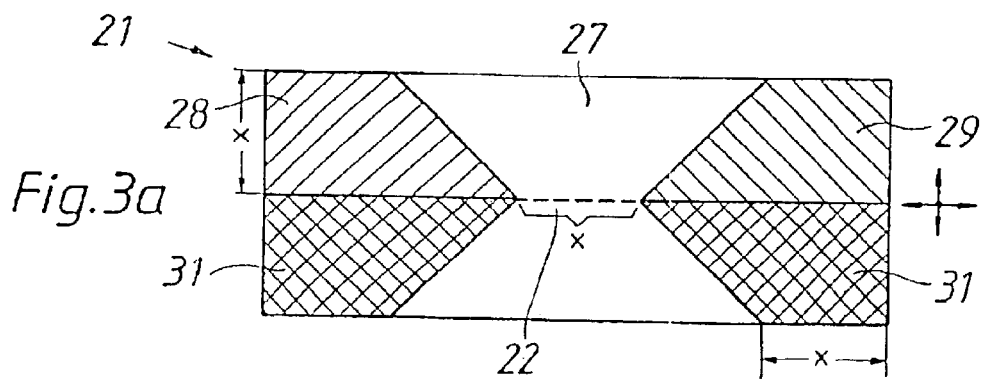

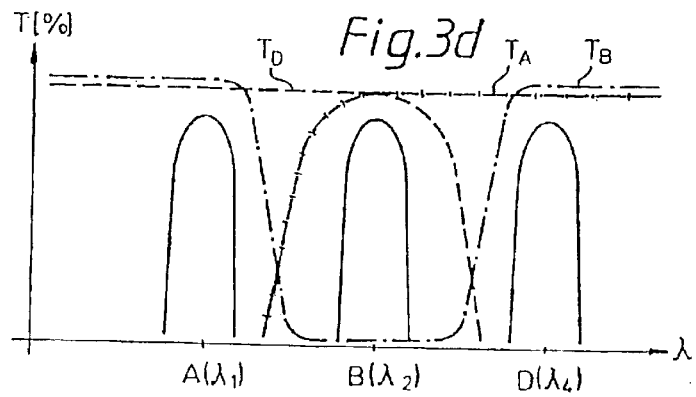
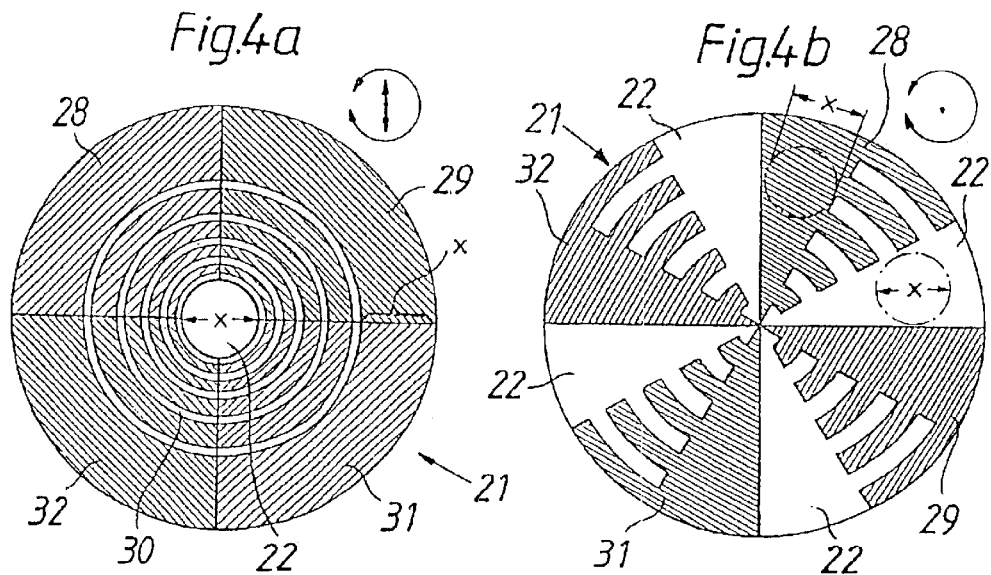
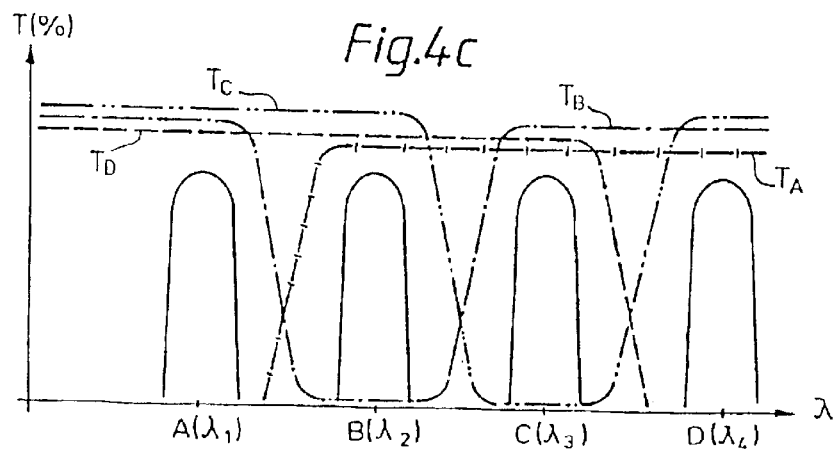

METHOD FOR THE INDIVIDUAL ADAPTATION OF EXCITATION INTENSITIES IN A MULTIBAND FLUORESCENCE MICROSCOPE AND MULTIBAND FLUORESCENCE MICROSCOPE FOR CARRYING OUT SAID METHOD

The invention relates to a method for the individual adaptation of excitation intensities in a multiband fluorescence microscope and a multiband fluorescence microscope to execute the method corresponding to the features of the introductory clause of the independent claims.

With the multiband fluorescence microscope, the user frequently confronts the problem that the different fluorescence bands in the microscopic image have varying intensities and are not uniformly visible. The cause lies frequently in the difference in excitation intensities in the illumination beam path or even in the varying blockage of the fluorescence intensities by a barrier filter in the imaging beam path. Also, different concentrations of the fluorescence dye for the different excitation bands, even when staining the objects to be considered, or the progressive bleaching of the dye, the so-called fading, lead to differing intensities of the fluorescence bands in the microscopic image. The different intensities of the fluorescence bands prove to be especially problematic then if the microscopic image is to be photographically recorded. Then the portion of the fluorescent light of weak intensity on the photo is too weakly reproduced or is not visible at all. Only with intensities of the fluorescence bands that are as uniform as possible can there be defect-free photos of the microscopic image.

U.S. Pat. No. 5,371,624 specifies a fluorescence microscope having only two excitation bands in which the intensities of the two excitation bands can be intermittently affected. It includes an illumination beam path having a light source and an excitation filter that produces several excitation bands of varying light wavelengths from the light of the light source. Furthermore, it has a splitter mirror, an output filter (also designated as a barrier filter or emission filter) for the fluorescent light and a filter element for affecting the intensities of the excitation bands.

The filter element can, by tilting continuously with respect to the optical axis, be switched between two limit positions having two fixed, predetermined values of the transmission factors of one or the other excitation band. In the one limit position, only the first excitation band is attenuated, in the other limit position only the second excitation band is attenuated and between the two limit positions, neither of the excitation bands is attenuated. A drop in the transmission factor of the particular excitation band is only possible up to the fixed, predetermined value. However, variation between a maximum transmission and a zero value, i.e., up to full suppression of one of the two excitation bands, is not possible. Moreover, only two excitation bands can be affected.

It is object of the present invention to specify a method for individual adaptation of excitation intensities in a multiband fluorescence microscope and a multiband fluorescence microscope to execute the method, in which one or more of the excitation bands can be partially or completely filtered out. For this purpose the transmission factor for each excitation band is to be continuously adjustable using simple means.

This objective is met by the invention via the characterizing features of the independent claims. Advantageous embodiments arise from the features of the dependent claims.

The method of the invention starts from a known multiband fluorescence microscope in which several excitation bands of varying wavelengths are produced using an excitation filter in an illumination beam path from the light of a light source. The excitation bands illuminate a fluorescence object prepared using fluorescence dyes and are converted by it into frequency-shifted fluorescence bands.

According to the invention, the fluorescence intensities of the individual fluorescence bands are first determined in the microscopic image and compared to previously set intensity setpoint values. The fluorescence intensities can be determined, for example, either visually or by using an intensity meter. This can consist for example of a video or CCD camera having an image analysis system connected in an outgoing circuit.

In this context a different intensity setpoint value can be set for each fluorescence band. However, in practice, the setpoint values are oriented toward concrete problems posed by the microscope user. If, for example, the microscopic image is to be documented either photographically or by video camera, and thus each fluorescence band in the photo or in the video image is to be reproduced with equal brightness, then the level of the setpoint values depends on the spectral sensitivity of the film or the camera. Therefore, their spectral sensitivity must be taken into consideration in the determination of setpoint values for the various excitation bands.

Therefore, the desired setpoint values must all be equal—and in particular equal to the lowest fluorescence intensity—provided that the film or the camera reproduces all spectral colors with equal intensity. However, if the spectral sensitivity of the video camera or of the film is not constant, then correspondingly varying setpoint values must be set for the different fluorescence bands in order to be able to reproduce the fluorescence bands with equal brightness.

On the other hand, if specific fluorescence bands do not appear on the photo or the video image, and thus are masked out, then the setpoint values for said bands must be equal to zero. In this context, it proves to be beneficial if the setpoint values are equal to the lowest of their intensities also for the fluorescence bands that are not masked out. Then these fluorescence bands all appear equally bright.

For each excitation band that is assigned to a fluorescence intensity deviating from the setpoint values, a selective filter according to the present invention tuned to the pertinent excitation band is brought into the illumination beam path. Its spectral transmission curve is configured so that exclusively the intensity of the pertinent excitation band is reduced, but the remaining spectral regions pass through unhindered.

In a multiband fluorescence microscope according to the invention for executing the method according to the invention, a filter draw assembly made of a multiplicity of individually movable filter draws is perpendicularly inserted in the illumination beam path tightly next to the aperture diaphragm plane.

The structure of the filter draw is a function of the number of the different excitation bands of the multiband fluorescence microscope. For a number of n excitation bands, each filter draw has n selective filters harmonized to the excitation bands and having surface regions with high and low transmission factors.

The different transmission factors are achieved by virtue of the fact that only certain area portions of the beam cross-section are occupied using separate filter-area elements. In this context as even a surface coverage of the beam cross-section as possible is sought so that no unilateral shading, and thus also no unilateral illumination of the pupils, is made. As a result a crooked illumination, and thus a lateral migration of the picture elements, is prevented during focusing.

It must be possible to insert the filters in the illumination beam path independently of each other individually or in combination using the desired surface region or the desired transmission. In this context, it must be possible with n excitation bands to combine a maximum of n−1 filters with each other, i.e. simultaneously insert them in the illumination beam path. This is sufficient since all excitation bands must never be attenuated simultaneously, because as a rule an excitation band supplies the intensity setpoint value and remains unchanged. Likewise, all excitation bands must not be triggered simultaneously, since this is equivalent to turning off the lighting.

In order to achieve the required combinations from n−1 filters, n−1 individually movable filter draws that are situated tightly parallel next to the aperture diaphragm plane with little distance between them and are effectual in combination are arranged in an advantageous embodiment of a multiband fluorescence microscope according to the invention having n excitation bands on n−1 disk planes. With each filter draw, one filter for an excitation band can be suitably adjusted so that altogether a maximum of n−1 excitation bands (one less than the maximum number) can be selectively attenuated or triggered.

For two excitation bands, it is sufficient if the two required filters are arranged in a single disk plane (n−1=1), since either only the one or only the other filter must be inserted in the illumination beam path. Therefore, a filter draw assembly to affect two excitation bands is preferably of one piece, thus designed with only one filter draw. However, for more than two excitation bands, a corresponding multipiece filter draw assembly must be provided with n−1 individually movable filter draws.

Except for the selective filters for the various excitation bands, each filter draw has at least one blank aperture with the beam diameter of the illumination beam path. In this case a blank aperture is arranged next to each filter. Depending on the embodiment, the filters can also be grouped directly around a single blank aperture. The transmission factor of the filter diminishes in the shifting direction as the distance from the blank aperture increases. In this case each filter has a surface region with the lowest transmission factor and a minimum diameter equal to the beam diameter x. If this surface region is inserted in the illumination beam path, the associated excitation band is maximally attenuated, i.e., to the zero value.

By correctly positioning each of the individual filters in the illumination beam path, the transmission factor that is acting on the illumination beam path is precisely individually adjusted such that by attenuating the excitation band assigned to the filter, the resulting fluorescence intensity matches its intensity setpoint value. To execute this process step, separate positioning means, which bring about the full or partial covering of the illumination beam path using the appropriate surface region of the filter draw, are assigned to each filter draw. Thus, the blank aperture or one or more of the filters or combinations of filter regions and the blank aperture can be inserted in the illumination beam path, according to preference. If this last process step was executed for all filters and thus all excitation bands, all fluorescence intensities match their setpoint values.

Even after optimal setting of the fluorescence intensities by applying the method according to the invention using a specified multiband fluorescence microscope, deviations of the fluorescence intensities from the setpoint values reoccur after some time. This is attributable to the fact that the various fluorescence dyes for the various excitation bands fade at differing rates, i.e., they exhibit a specific fading.

Therefore, in one advantageous embodiment of the method, the time changes of the fluorescence intensities are continuously determined. The transmission factors of the filter that are in effect within the illumination beam path are then repeatedly adjusted at specific time intervals so that the fluorescence intensities are always brought into accord with their setpoint values.

An especially advantageous embodiment of the method provides for an automatic fading compensation. For this purpose the time modifications of the fluorescence intensities are automatically continually determined. To do this the microscopic image, for example, can be automatically continually recorded using a video camera and the fluorescence intensities contained therein can be determined using an image analysis system and compared to the predetermined setpoint values.

Then the transmission factors of the filter are automatically continuously modified and adapted so that the fluorescence intensities are always kept at the intensity setpoint values. To this end, motorized positioning means, for example, can be used. The drive of the motors and regulation of the fluorescence intensities in relation to the setpoint values can be achieved using an electronic unit and a computer to which the signals of the video camera or the image analysis system are fed.

Figure 3B:
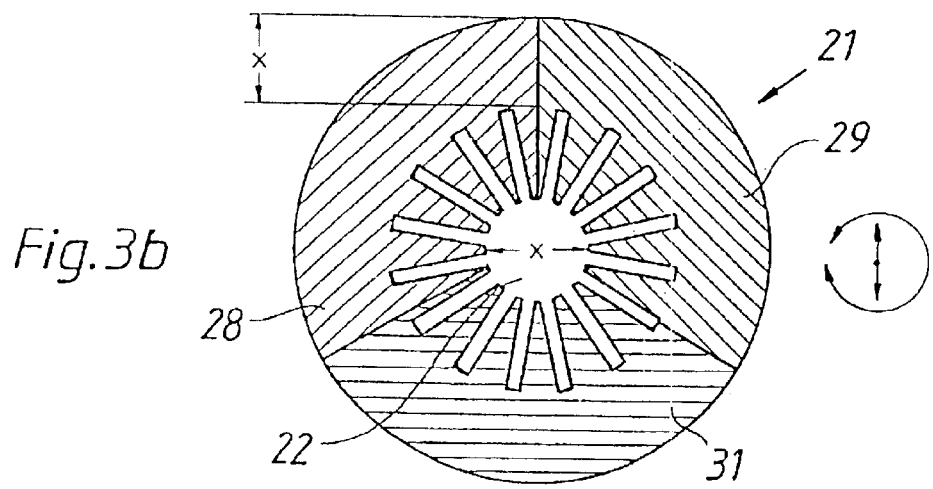
Figure 3C:
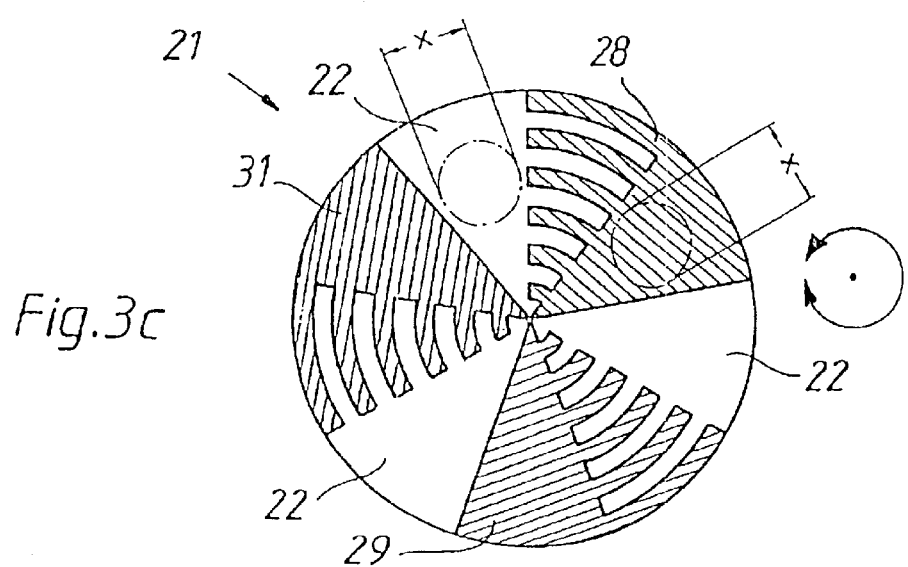

The invention is explained in more detail below with respect to the schematic drawing. Shown are:

FIG. 1 a beam path of a multiband fluorescence microscope according to the invention;

FIGS. 2a–d various embodiments of a filter draw for a dual-band fluorescence microscope;

FIG. 2e the spectral transmission curve of the excitation bands and the assigned filter of a filter draw for a dual-band fluorescence microscope;

FIGS. 3a–c various embodiments of a filter draw for a two-piece filter draw assembly of a three-band fluorescence microscope;

FIG. 3d the spectral transmission curve of the excitation bands and the assigned filter of a filter draw for a three-band fluorescence microscope;

FIGS. 4a–b various embodiments of a filter draw for a three-part filter draw assembly of a four-band fluorescence microscope;

FIG. 4c the spectral transmission curve of the excitation bands and the assigned filter of a filter draw for a four-band fluorescence microscope.

FIG. 1 shows a beam path of a multiband fluorescence microscope for executing the method according to the invention. From a light source 1 an illumination beam path starts with an optical axis 2 in which a collector 3, a first lens member 4, an aperture diaphragm 5, a second lens member 6, a radiant field stop 7, a third lens member 8 and a excitation filter 9 are arranged in succession to produce the excitation bands. The illumination beam path is deflected at a beam splitter 10 to an objective 11. It passes through the objective 11 and reaches a fluorescence object 12, which rests on a specimen stage 13.

The excitation bands produced by excitation filter 9 in the illumination beam path are converted into fluorescence bands 12 by fluorescence dyes that were injected in fluorescence object 12, and said bands are emitted by the fluorescence object in a frequency-shifted state. This fluorescence light passes through objective 11, beam splitter 10, an output filter 14, a tube lens 15 and reaches an intermediate image plane 16. The intermediate image produced here can be considered by microscope user using an eyepiece 17. The intermediate image is displayed via a TV output on a video camera 18 having an image analysis system 19 connected in series. With this design the fluorescence intensities of the individual fluorescence bands in the microscopic image can be determined either visually using eyepiece 17 or using image analysis system 19 and then compared to intensity setpoint values greater than or equal to zero.

To attenuate the excitation bands, a filter draw assembly 20 according to the invention, consisting in this example of two filter draws 21a and 21b, is inserted perpendicular to the optical axis 2 of the illumination beam path tightly next to, i.e., behind or in front of aperture diaphragm plane 24. Arranged on each filter draw 21a, 21b are a blank aperture 22 and in addition several selective filters 23 tuned to the excitation bands. By arranging filter draws 21a, 21b as narrowly as possible, filters 23 can be situated as tightly as possible next to aperture diaphragm plane 24. This ensures that the inserted filter draws 21a, 21b are not visible in the image. A further advantage is that in this case the least possible beam fanning occurs, so that the surface region of filter 23 can be kept as small as possible.

According to the present invention, positioning means are assigned to each filter draw. In this context positioning means having the possibility of manual adjustability can be used in economic embodiments. Although motorized positioning means are more expensive, they permit an automation of the method according to the invention.

In the embodiment illustrated here, two motors 25a, 25b that can shift parallel to the aperture diaphragm plane and/or rotate filter draws 21a, 21b are arranged as positioning means for filter draws 21a, 21b. Using the motors 25a, 25b either the blank aperture 22 or a selective filter 23 or a combination of the two can be inserted in the illumination beam path by the particular assigned filter draw 21a or 21b. The motors 25a, 25b are driven by control electronics 26, which receive the input signal from the image analysis system 19.

The image analysis system 19 determines from the camera signal the deviation of the fluorescence intensities from their setpoint values. Then those excitation bands that cause the deviations from setpoint values are determined and one of the filter draws 21a, 21b is assigned to each of these excitation bands for attenuation. In the illustrated example, two excitation bands can thus be completely attenuated, i.e. to the zero value, or even partially attenuated. For each filter draw 21a, 21b a drive signal is produced for the associated motor 25a, 25b. Each filter draw 21a, 21b is continuously shifted via the associated motor 25a, 25b so that a filter 23 selectively acting on the assigned excitation band is inserted in the illumination beam path. Then the filter draw 21a or 21b is shifted further until a surface region of the inserted filter 23 has a transmission factor in the illumination beam path through which the assigned excitation band is attenuated to the intensity setpoint value. In this way, all excitation bands are set to their intensity setpoint values.

Different embodiments of filter draw assembly 20 or the filter draw 21 and the associated spectral transmission curves of the filters arranged on them are explained below.

A filter draw 21 for a multiband fluorescence microscope having two excitation bands A and D is depicted in FIG. 2a. Applied to a rectangular glass plate 27 as different vapor deposition layers are a long-pass filter 29 for the intensity reduction of the short-wave excitation band A and a short-pass filter 28 for the intensity reduction of the long-wave excitation band D. They are located on the ends of the glass plate 27, and between them is the blank aperture 22 in the center of filter draw 21. Its cross-section is equal to the beam diameter x in the aperture diaphragm 5 of the illumination beam path. Filter draw 21 can be continuously shifted by positioning means (not shown) longitudinally in both directions parallel to the aperture diaphragm plane 24. The movement is indicated by a double arrow.

Short-pass filter 28 and long-pass filter 29 are each applied in this version as a connected vapor-deposition layer. The transmission of the two filters 28, 29 is largest right next to blank aperture 22 and gets smaller as the distance from blank aperture 22 increases. To this end next to blank aperture 22 filter draw 21 is not completely covered with filters 28, 29, but rather the portion of the filter area increases as one moves from blank aperture 22 toward the end of filter draw 21.

Thus, the vapor-deposition layers on the ends of filter draw 21 form a rectangle with a minimum edge length equal to the beam diameter x. If this vapor-deposited rectangular area completely covers the illumination beam path, the smallest percentile is thus set and the accompanying excitation band is completely attenuated, i.e., to the zero value. The vapor-deposited rectangular area borders the base of vapor-deposited triangular area, whose opposing corner faces blank aperture 22.

Via the vapor-deposited triangular areas, which always cover the beam diameter only partially, the transmission factor of short-pass filter 28 and long-pass filter 29 in each case diminishes as one moves from blank aperture 22 toward the ends of filter draw 21. By inserting any fractional area of short-pass filter 28 or of long-pass filter 29, any desired transmission factor of the filter 28, 29 in the illumination beam path can be realized and thus one or the other excitation band can be weakened or faded out according to preference.

A filter draw 21 for a multiband fluorescence microscope according to the invention having two excitation bands A and D is likewise depicted in FIG. 2b. Applied to a rectangular glass plate 27 are a short-pass filter 28 for filtering the long-wave excitation band A and a long-pass filter 29 for filtering the short-wave excitation band D as different vapor-deposition layers.

Here, as in FIG. 2a, the vapor-deposition layers in the direction of blank aperture 22 have a triangular contour. However, the triangles in this case are each not vapor-deposited as connected areas, but rather as small area elements 30 of equal size. In this way a longer adjustment range with higher transmissions is achieved for the two filters 28, 29. At the ends of filter draw 21, the vapor-deposition layers form a rectangle having a minimum edge length equal to the beam diameter x and thus a region of the least transmission with which the assigned excitation band can be attenuated to zero.

Another filter draw 21 for a multiband fluorescence microscope according to the invention having two excitation bands A and D is depicted in FIG. 2c. Applied to a rectangular glass plate 27 are a short-pass filter 28 for filtering the long-wave excitation band A and a long-pass filter 29 for filtering the short-wave excitation band D as different vapor-deposition layers. Located between them is a blank aperture 22.

The filters 28, 29 are vapor-deposited in this version of filter draw 21 next to blank aperture 22 as separate area elements 30 formed in any way desired (here circular).

In this context, the size of area elements 30 and thus the portion of the area of filter draw 21 increases when moving from blank aperture 22 to the ends of filter draw 21. The transmission factor of filters 28, 29 is largest next to blank aperture 22 and diminishes when moving in the direction toward the ends of filter draw 21. On both ends of filter draw 21, each of the two filters 28, 29 have a completely vapor-deposited area with the smallest transmission factor, said area having at least the diameter x of the beam path.

Another filter draw 21 for a multiband fluorescence microscope according to the invention having two excitation bands A and D is depicted in FIG. 2d. Applied to a rectangular glass plate 27 are a short-pass filter 28 for filtering the long-wave excitation band A and a long-pass filter 29 for filtering the short-wave excitation band D as different vapor-deposition layers. Located between them is a blank aperture 22.

In this embodiment the vapor-deposition layers are applied as strip-shaped area elements 30, the width of the strips increasing as one moves from the center to the ends of filter draw 21. In this way the transmission diminishes as one moves from the blank aperture 22 toward the ends of filter draw 21. Also here the two filters 28, 29 each have a completely vapor-deposited surface with the lowest possible transmission factor at both ends of filter draw 21, said surface having at least the diameter x of the beam path.

The spectral transmission curves of the short-wave excitation band A and the long-wave excitation band D, as well as the transmission curves $T_A$, $T_D$ of the associated selective filter, thus the long-pass filter for the short-wave excitation band A and the short-pass filter for the long-wave excitation band D, are depicted in FIG. 2e as a function of the light wavelength λ. Filters A and B are selected so that they only selectively filter out the associated excitation band for each but allow the remaining wavelength ranges to pass through unhindered.

FIG. 3a shows a rectangular filter draw 21 of a two-piece filter draw assembly 20 for a multiband fluorescence microscope having three excitation bands A, B, D. In this embodiment filter draw assembly 20 consists of two rectangular filter draws 21 identical to said bands that are tightly inserted in the illumination beam path one behind the other next to the aperture diaphragm plane 24.

Provided in the center of filter draw 21 is the blank aperture 22 having diameter x of illumination beam path 2. Applied as vapor-deposition layers on the two ends of filter draw 21 are two different combinations of two or three selective filters 28, 29, 31 for excitation bands A, B, D. The two filters 28, 31 or 29, 31 on one end are in each case arranged next to one another so that both filters border each other and blank aperture 22. In this context each filter 28, 29, 31 has an area of least transmission having at least the diameter x of illumination beam path 2. As a result filter draw 21 has at least a width of 2x on its short end.

The transmission factor of filters 28, 29, 31 diminishes as one moves in the longitudinal direction of filter draw 21, thus in the direction of shift from blank aperture 22 toward the ends. This is realized in the example represented here in that the vapor-deposited surface of each filter 28, 29, 31 increases as one moves from blank aperture 22 toward the end of filter draw 21.

Separate positioning means 25 for shifting filter draw 21 parallel to aperture diaphragm plane 24 in both the longitudinal and transverse directions are provided for each of the two identical shifters 21 of the filter draw assembly. As a result it is possible to insert filters 28, 29, 31, individually or in combination, completely or with only a portion of their surface in the illumination beam path.

FIG. 3b shows a circular filter draw 21 of a two-piece filter draw assembly 20 for a multiband fluorescence microscope according to the invention having three excitation bands A, B, D. In this advantageous embodiment of the multiband fluorescence microscope according to the invention, filter draw assembly 20 consists of two circular filter draws 21 identical to said bands that are tightly inserted in the illumination beam path one behind the other next to the aperture diaphragm plane 24. Provided in the center of each filter draw 21 is blank aperture 22. Three selective filters 28, 29, 31 for excitation bands A, B, D are arranged bordering said opening as vapor-deposited ring sectors that border each other.

Filters 28, 29, 31 each possess a transmission factor that decreases as radius increases and is largest next to blank aperture 22. This is accomplished, for example, by virtue of filters 28, 29, 31 not being fully vapor-deposited. Instead, vapor-deposited area elements 30 that get wider as they extend radially and that have non-vapor-deposited surface regions are applied in between them next to blank aperture 22 so that the portion of vapor-deposited surface of each filter 28, 29, 31 increases as the radius increases.

Using separate positioning means (not shown here), each of the two identical filter draws 21 of filter draw assembly 20 can be shifted individually and parallel to aperture diaphragm plane 24. In this case it can either be laterally shifted in one direction and also rotated (as indicated in FIG. 3b) or, alternatively, shifted within a plane in two directions. As a result any desired fractional area of filter draw 21, for example blank aperture 22 or one of the filters 28, 29, 31 having the desired transmission factor, can be inserted in the illumination beam path. By arranging two equal filter draws 21 in the illumination beam path, any two of the three filters 28, 29 31 can be inserted simultaneously in the illumination beam path so that two of the three excitation bands can be simultaneously weakened to the predetermined setpoint values or completely faded out.

FIG. 3c shows an especially advantageous embodiment of a filter draw 21 for a two-piece filter draw assembly 20 of a multiband fluorescence microscope according to the invention having three excitation bands A, B, D. In this embodiment of the multiband fluorescence microscope, filter draw assembly 20 consists of two circular filter draws 21 identical to said bands that are inserted in the illumination beam path tightly in succession next to aperture diaphragm plane 24.

The filters 28, 29, 31 for the excitation bands A, B, D are advantageously arranged on the filter draw 21 such that it only has to be turned but not shifted (rotary movement is indicated). This simplifies the structure of the mechanical or even motorized positioning means, which are separately assigned to each of the two filter draws 21 (not shown).

In order to accomplish this, each filter draw 21 is designed with a circular shape, divided into six sectors and arranged pivoted around its center. The center of the circle lies outside the illumination beam path. Each sector can be turned by rotating filter draw 21 into the illumination beam path and cover it completely. The beam cross section with the diameter x is inscribed.

Each second sector is a blank aperture 22. Applied, for example glued on or vapor-deposited, in between each is one of the three filters 28, 29, 31 for the three excitation bands A, B, D. Each filter 28, 29, 31 exhibits an increase of the transmission factor inside its sector in one of the two directions of rotation, for example via different surface coverage with vapor-deposited area elements. As a result each filter 28, 29, 31 has next to the one neighboring blank aperture 22 a maximum transmission factor and next to the other neighboring blank aperture 22 a minimum transmission factor. By rotating the filter draw 21, one of the blank apertures 22 or one of the filters 28, 29, 31 with the desired transmission or a combination of the two can be inserted in the illumination beam path. The use of two identical filter draws 21 as a filter draw assembly makes it possible to attenuate up to two of the three excitations bands A, B, D simultaneously and independently of each other to the desired setpoint value.

FIG. 3d shows the spectral transmission curves of the short-wave excitation band A, of the long-wave excitation band D and an intermediate excitation band B as a function of the light wavelength $\lambda$.

Furthermore, the transmission curves $T_A$, $T_B$, $T_D$ of the accompanying selective filters are depicted, thus the long-pass filter for the short-wave excitation band A, of the short-pass filter for the long-wave excitation band D and a selective filter for the excitation band B. The filters are selected so that they only selectively filter out the associated excitation band, but the remaining wavelength ranges pass through unhindered FIG. 4a shows a circular filter draw 21 for a three-part filter draw assembly 20 of a multiband fluorescence microscope according to the invention having four excitation bands A, B, C, D. In this embodiment of the multiband fluorescence microscope according to the invention, filter draw assembly 20 consists of three circular filter draws identical to said bands that are tightly inserted in the illumination beam path one behind the other next to the aperture diaphragm plane 24. Each filter draw 21 has a blank aperture 22 in the center. In addition four selective filters 28, 29, 31, 32 for the excitation bands A, B, C, D, are vapor deposited as ring sectors that border each other.

The transmission factor of the filters 28, 29, 31, 32 diminishes as the radius increases and is largest next to the blank aperture 22. This is achieved, for example, by vapor-depositing the filters 28, 29, 31, 32 not completely, but as ring-shaped area elements 30 with non-vapor-deposited areas with vapor-deposition between them, whereby the portion of the vapor-deposited area of each filter 28, 29, 31, 32 increases as the radius increases.

Separate positioning means (not shown) are assigned to each of the three filter draws 21 of filter draw assembly 20. Using these positioning means, each filter draw 21 can be moved individually and parallel to aperture diaphragm plane 24. In this case it can be shifted laterally in one direction and also rotated (as indicated in FIG. 4a) or alternatively shifted in two directions within one plane.

As a result, any fractional area of filter draw 21, thus the blank aperture 22 or any fractional area filters 28, 29, 31, 32, can be inserted in the illumination beam path. By arranging three equal filter draws 21 in the illumination beam path, any three of the four filters 28, 29, 31, 32 can be simultaneously inserted in the illumination beam path. As a result up to three of the four excitation bands A, B, C, D can be weakened to the predetermined setpoint value or even faded out completely.

FIG. 4b shows an especially advantageous embodiment of a filter draw 21 for a three-part filter draw assembly 20 for a multiband fluorescence microscope according to the invention having four excitation bands A, B, C, D. In this embodiment of the multiband fluorescence microscope according to the invention, filter draw assembly 20 consists of three circular filter draws 21 identical to said bands and are inserted in the illumination beam path tightly in succession next to aperture diaphragm plane 24.

The filters 28, 29, 31, 32 for the excitation bands A, B, C, D are arranged on the filter draw 21 such that it only has to be rotated, but does not have to be moved (rotating movement is indicated). That simplifies the design of the mechanical or even motorized positioning means that are separately assigned to each of the three filter draws 21 (not shown).

This is achieved by virtue of each filter draw 21 being designed with a circular shape, divided into eight sectors and mounted pivoted around its center. The center of the circle is outside the illumination beam path. By rotating the filter draw 21, each sector can be brought to totally or partially cover the illumination beam path. The beam cross section with the diameter x is inscribed.

Every second sector is a blank aperture 22. In between them one of the four filters 28, 29, 31, 32 is applied, e.g., glued or vapor-deposited, for the three [sic] excitation bands A, B, C, D. Each filter 28, 29, 31, 32 exhibits an increase of the transmission factor inside its sector in one of the two directions of rotation, for example, via different area coverage. As a result each filter 28, 29, 31, 32 has a maximum transmission factor next to the one neighboring blank aperture 22 and a minimum transmission factor next to the other neighboring blank aperture 22.

By rotating filter draw 21, one of blank apertures 22 or one of filters 28, 29, 31, 32 having the desired transmission of a combination of both can be inserted in the illumination beam path. By using three filter draws 21, up to three of the four excitation bands A, B, C, D can be attenuated to the desired setpoint value simultaneously and independently of one another.

In FIG. 4c, the spectral transmission curves of the short-wave excitation band A, of the long-wave excitation wave excitation band D and of the two excitation bands B and C between them are represented as a function of the light wavelength $\lambda$. Furthermore, the transmission curves $T_A$, $T_B$, $T_C$, $T_D$ are specified for the associated selective filter, thus the long-pass filter for the short-wave excitation band A, the short-pass filter for the long-wave excitation band D, a selective filter for the excitation band B and a selective filter for the excitation band C. Filters A, B, C, D are selected so that they only selectively filter out the particular associated excitation band, but the remaining wavelength ranges pass through unhindered.

For more than four excitation bands, the filter draw assembly 20 must be expanded accordingly. However, it is becoming increasingly difficult to place the individual filters close enough next to aperture diaphragm 5.

| Reference symbol list | |
|---|---|
| 1 | Light source |
| 2 | Optical axis of the illumination beam path |
| 3 | Collector |
| 4 | First lens member |
| 5 | Aperture diaphragm |
| 6 | Second lens member |
| 7 | Radiant field stop |
| 8 | Third lens member |
| 9 | Excitation filter |
| 10 | Beam splitter |
| 11 | Objective |
| 12 | Fluorescence object |
| 13 | Specimen stage |
| 14 | Output filter |
| 15 | Tube lens |
| 16 | Intermediate image plane |
| 17 | Eyepiece on tube (17') |
| 18 | Video camera |
| 19 | Image analysis system |
| 20 | Filter draw assembly |

-continued

Reference symbol list

| | |
|---|---|
| 21 | Filter draw (also 21a, 21b) |
| 22 | Blank aperture |
| 23 | Selective filter(s) |
| 24 | Aperture diaphragm plane |
| 25 | Positioning means (25a, 25b motors) |
| 26 | Control electronics |
| 27 | Glass plate |
| 28 | Short-pass filter for the long-wave excitation band D ($\lambda_4$) |
| 29 | Long-pass filter for the short-wave excitation band A ($\lambda_1$) |
| 30 | Area element(s) |
| 31 | Subtractive filter for excitation B($\lambda_2$) |
| 32 | Subtractive filter for excitation C($\lambda_3$) |
| x | Beam diameter in the aperture diaphragm plane 24 |

What is claimed is:

1. A method for the individual adaptation of excitation intensities in a multiband fluorescence microscope having several spectrally different excitation bands that are simultaneously converted from a fluorescence object into fluorescence bands having fluorescence intensities, which comprises the steps of:
   a) determining the fluorescence intensities of the individual fluorescence bands of a microscopic image and compare to intensity setpoint values larger than or equal to zero,
   b) for each excitation band that is assigned to a fluorescence intensity deviating from the intensity setpoint values, bringing a filter into an illumination beam path, and
   c) continuously adjusting the transmission factors of said filter in effect in the illumination beam path so that by attenuating the associated excitation bands, all fluorescence intensities are adjusted to their intensity setpoint values.

2. The method as recited in claim 1, wherein the setpoint values for the different fluorescence intensities are all equal to the lowest fluorescence intensity.

3. The method as recited in claim 2, wherein
   a) modifications of the fluorescence intensities are automatically continuously determined,
   b) and by automatic continuous adaptation of the transmission factors of said filter in effect in the illumination beam path, the fluorescence intensities are always kept at their setpoint values.

4. The method as recited in claim 1, wherein at least one of the setpoint values for the different fluorescence intensities is equal to zero.

5. The method as recited in claim 1, wherein for some fluorescence intensities the setpoint values are equal to zero and for the rest are equal to the lowest fluorescence intensities.

6. The method as recited in claim 1, wherein the different fluorescence intensities are visually determined.

7. The method as recited in claim 1, wherein the different fluorescence intensities are determined using an intensity meter.

8. The method as recited in claim 7, wherein the different fluorescent intensities are determined using a CCD or a video camera having an image analysis system.

9. The method as recited in claim 1, wherein
   a) modifications of the fluorescence intensities are continuously determined,
   b) and by repeated adaptation of the transmission factors of said filter in effect in the illumination beam path, the fluorescence intensities are always brought back to their setpoint values.

10. A multiband fluorescence microscope comprising an illumination beam path having a light source, a collector, a multiplicity of lens members, an aperture diaphragm, a radiant field diaphragm, an excitation filter for simultaneous production of several excitation bands of different light wavelengths and a filter element to affect the excitation bands, a beam splitter and an objective that directs the illumination beam path onto a fluorescence object on a specimen stage projecting it through the beam splitter, an output filter and a tube lens into an intermediate image plane, wherein
    a) a filter draw assembly made of individually movable, tightly spaced filter draws is inserted perpendicular in the illumination beam path tightly next to the aperture diaphragm,
    b) a selective filter is provided on each filter draw for each excitation band that has surface regions with high and low transmission factors,
    c) the surface region having the lowest transmission factor has a minimum diameter equal to the beam diameter (x) to completely cancel the excitation band,
    d) a blank aperture having the beam diameter (x) is arranged next to each filter,
    e) the transmission factor of each filter diminishes as one moves further away from the blank aperture, and
    f) separate positioning means, with which any surface region of the filter draw can be inserted in the illumination beam path, are assigned to each filter draw.

11. The fluorescence microscope as recited in claim 10, wherein to affect a number n of excitation bands
    a) the filter draw assembly consists of n–1 filter draws on separate, tightly spaced n–1 layers/planes parallel to the aperture diaphragm plane,
    b) each filter draw has at least one blank aperture and n selective filters for the n excitation bands.

12. The fluorescence microscope as recited in claim 11, wherein
    a) the filter draw has a transparent, rectangular glass plate on whose ends the short-pass filter and the long-pass filter (29) applied as vapor deposition layers are opposite one another,
    b) and the short-pass filter and the long-pass filter each have an increasing portion of the vapor-deposited glass surface, and as a result a decreasing transmission as one moves from the blank aperture toward the ends of the filter draw.

13. The fluorescence microscope as recited in claim 10, wherein to affect two excitation bands (A, D) a single filter draw is provided,
    a) that has on its one end a long-pass filter to weaken the intensity of the short-wave excitation band (A),
    b) that has on its other end a short-pass filter to weaken the intensity of the long-wave excitation band (D),
    c) and has the blank aperture in between them,
    d) and positioning means for continually shifting the filter draw are mounted parallel to the aperture diaphragm plane.

14. The fluorescence microscope as recited in claim 13, wherein the areas of the two vapor-deposition layers at the ends of the filter draw each have the form of a rectangle having a minimum edge length equal to the beam diameter (x) against which the base of a vapor-deposited, isosceles triangle area borders in the direction of the blank aperture.

15. The fluorescence microscope as recited in claim 13, wherein the vapor-deposition layers are applied neither wholly or in part as connected, but rather as area elements whose size or distances are selected differently as one moves in the direction of shifting from the blank aperture toward the ends.

16. The fluorescence microscope as recited in claim 10, wherein a two-piece filter draw assembly is provided to affect three excitation bands (A, B, D),
   a) each filter draw having a circular blank aperture in the center,
   b) three selective filters for the excitation bands (A,B,D) having a transmission factor that diminishes as the radius increases arranged as sectors around the center,
   c) and separate positioning means, with which the filter draws can be shifted independently of each other parallel to the aperture diaphragm plane and or rotated, are assigned to each filter draw.

17. The fluorescence microscope as recited in claim 16, wherein to achieve a transmission factor that diminishes as the radius increases, the portion of the vapor-deposited area of the filter increases as the radius increases.

18. The fluorescence microscope as recited in claim 10, wherein a two-piece filter draw assembly made of two circular filter draws is provided to affect three excitation bands (A,B,D)
   a) each filter draw being divided into six sectors covering the illumination beam path and being arranged around its center situated outside the beam path,
   b) every second sector being a blank aperture and with one of the three selective filters for the excitation bands (A, B, D) being situated between each pair.
   c) each filter exhibiting an increase of the transmission factor in one of the two directions of rotation.
   d) and separate positioning means being provided for rotating each filter draw around its center and parallel to the aperture diaphragm plane.

19. The fluorescence microscope as recited in claim 10, wherein a two-piece filter draw assembly made of two rectangular filter draws is provided to affect three excitation bands (A, B, D),
   a) each filter draw having a blank aperture in the center and having at both of its ends two different combinations of two out of three of the selective filters for the excitation bands,
   b) the transmission factor of the filters diminishing in the longitudinal direction of the filter draw moving from the blank aperture toward the ends,
   c) and separate positioning means being arranged for shifting the filter draw in the longitudinal direction and parallel to the aperture diaphragm plane.

20. The fluorescence microscope as recited in claim 10, wherein a three-piece filter draw assembly made of three circular filter draws is provided to affect four excitation bands (A,B,C,D),
   a) each filter draw having a blank aperture in the center and four selective filters situated around said center for the excitation bands as vapor-deposited ring sectors that border each other and have a transmission factor that decreases as the radius increases,
   b) and separate positioning means being provided parallel to the aperture diaphragm plane for shifting and/or rotating each filter draw.

21. The fluorescence microscope as recited in claim 10, wherein a three-piece filter draw assembly made of three circular filter draws is provided to affect four excitation bands (A, B, C, D),
   a) each filter draw being divided into eight sectors covering the illumination beam path and being located pivoted around its center, which lies outside the beam path,
   b) every second sector being a blank aperture and in between them being situated one of the four selective filters for the excitation bands,
   c) each filter showing an increase in the transmission factor in one of the two directions of rotation,
   d) and separate positioning means being provided for rotating each filter draw around its center and parallel to the aperture diaphragm plane.

* * * * *